United States Patent [19]
Miyazaki et al.

[11] Patent Number: 5,461,234
[45] Date of Patent: Oct. 24, 1995

[54] METHOD AND APPARATUS FOR MEASURING ULTRASHORT LASER PULSES

[75] Inventors: Kenzo Miyazaki; Hirofumi Sakai, both of Tsukuba, Japan

[73] Assignees: Agency of Industrial Science & Technology; Ministry of International Trade & Industry, both of Tokyo, Japan

[21] Appl. No.: 293,166

[22] Filed: Aug. 19, 1994

Related U.S. Application Data

[63] Continuation of Ser. No. 945,900, Sep. 17, 1992, abandoned.

[30] Foreign Application Priority Data

Oct. 7, 1991 [JP] Japan .................................. 3-287096

[51] Int. Cl.$^6$ .................................. G01J 1/04; G02F 1/37
[52] U.S. Cl. .......................... 250/372; 356/121; 359/328
[58] Field of Search ..................... 356/72, 121; 359/328, 359/329; 250/372

[56] References Cited

U.S. PATENT DOCUMENTS

| 4,577,122 | 3/1986 | Kung ........................................ 359/329 |
| 4,681,436 | 7/1987 | Ghing et al. ............................ 356/213 |

FOREIGN PATENT DOCUMENTS 1-29718  1/1989  Japan .................................... 359/328

*Primary Examiner*—Vincent P. McGraw
*Attorney, Agent, or Firm*—Oblon, Spivak, McClelland, Maier & Neustadt

[57] ABSTRACT

The duration or pulse width of an ultrashort laser pulse is measured by disposing a nozzle in a vacuum, intermittently or continuously jetting an atomic or molecular gas beam from the nozzle, directing ultrashort laser pulses to be measured into the beam to produce harmonic radiation of the laser pulse in the gas beam or produce ions by absorption of multiple laser photons, and detecting a signal related to the harmonic or the ions.

14 Claims, 5 Drawing Sheets

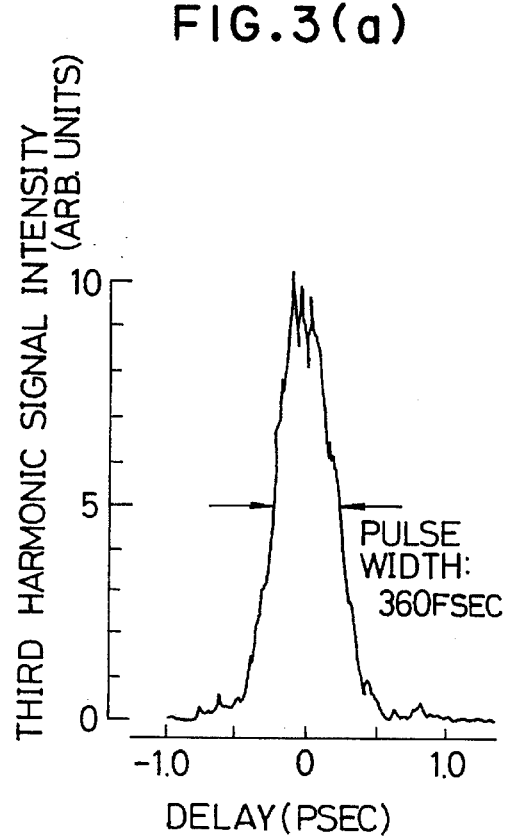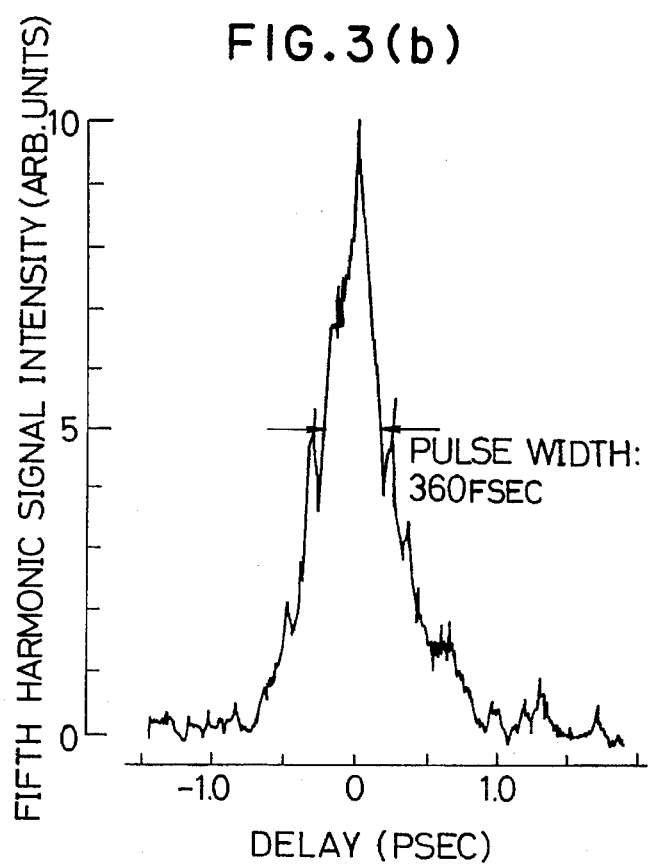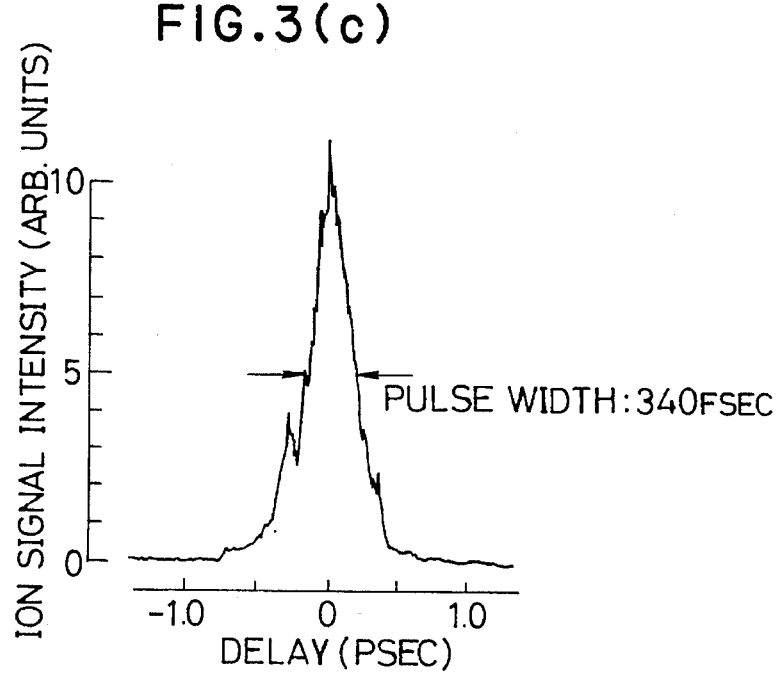

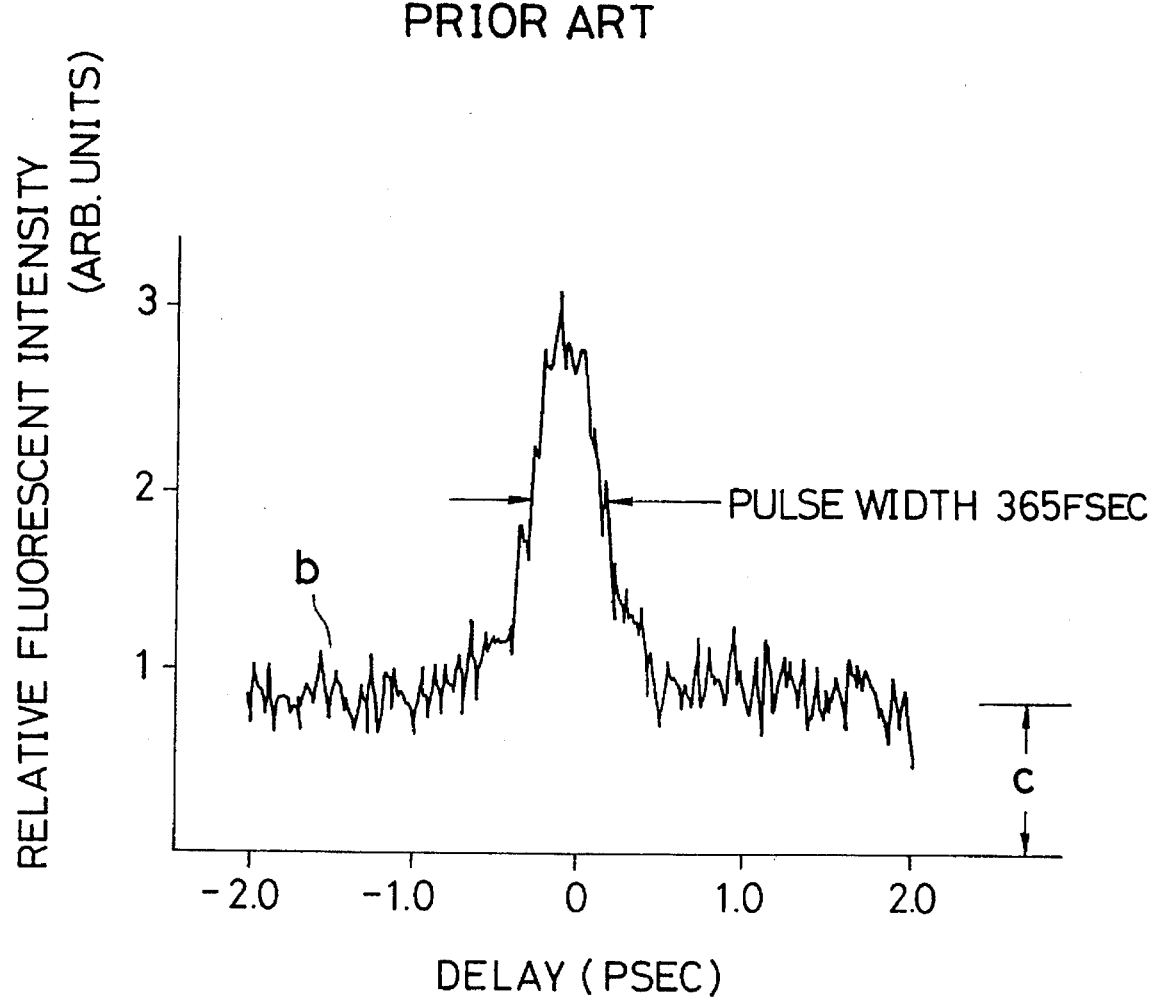

METHOD AND APPARATUS FOR MEASURING ULTRASHORT LASER PULSES

This application is a continuation of application Ser. No. 07/945,900, filed on Sep. 17, 1992, now abandoned.

BACKGROUND OF THE INVENTION

1. Field of the Invention

This invention relates to a method and an apparatus for measuring the duration and width of ultrashort laser pulses in the evaluation etc. of the properties of ultrashort-pulse lasers that can be applied to ultra-high speed electronic devices, ultra-high speed photo-chemical reaction measurement apparatuses, highly time-resolved optical measurement instruments and the like.

2. Prior Art Statement

Because of their slow response speed, conventional and ordinary optical detectors cannot be used for direct photoelectric measurement of ultrashort laser pulses having widths of less than a few picoseconds ($10^{-12}$ sec). In the case of ultrashort laser pulses generated from visible or near infrared lasers whose wavelengths are longer than about 400 nm, therefore, the practice has been to carry out the pulse width measurement by the autocorrelation method using the second harmonic generation in a nonlinear crystal.

Since the distance that light travels through air in one picosecond is 0.3 mm, this conventional autocorrelation method measures the width or duration of ultrashort laser pulses by replacing time with the light propagation distance. Specifically, as shown in FIG. 4, a laser pulse p to be measured is directed into an autocorrelator 1 composed of a half-mirror M1 and reflecting mirrors M2, M3 and M4. The half-mirror M1 splits the laser pulse p into two laser pulses $p_1$ and $p_2$. The pulse $p_1$ is reflected by the reflecting mirror M2 and travels to a lens 2, thus traversing a prescribed spatial distance. The pulse $p_2$ is reflected by the reflecting mirror M3 and travels to the lens 2, also traversing a prescribed spatial distance. The lens 2 focuses the pulses $p_1$, $p_2$ from the autocorrelator 1 into a nonlinear crystal 3.

When the distances that the pulses $p_1$, $p_2$ divided by the half-mirror M1 travel from M1 to the nonlinear crystal 3 are of the same length, the two pulses overlap in time in the nonlinear crystal 3. As a result, the second harmonic radiation of the incident laser light (the second harmonic wavelength being $\lambda/2$ where the laser wavelength is $\lambda$) is generated in the nonlinear crystal 3 in the direction approximately bisecting the cross angle of the two pulses and arrives at a light detector 5 through an aperture 4.

When there is a difference between the propagation path lengths of the two laser pulses $p_1$, $p_2$ which is longer than that corresponding to the laser pulse duration, no temporal overlap of the laser pulses occurs in the nonlinear crystal 3, and the second harmonic radiation is not generated.

As the intensity of the second harmonic produced increases in proportion to the square of the intensity of the laser pulses incident on the nonlinear crystal 3, the pulse duration or the pulse width of the laser pulse p can be measured by translating either the reflecting mirror M2 or the reflecting mirror M3 in parallel with the optic axis and detecting and recording the intensity variation of the second harmonic radiation as a function of the position of the mirror M2 (or M3) that is moved.

This ultrashort laser pulse measurement method using a nonlinear crystal is useless when the laser wavelength is in the ultraviolet region of less than about 400 nm, because nonlinear crystals capable of producing the second harmonic radiation in a broad spectral region of less than 200 nm are not available.

Instead, therefore, there has so far been adopted a method using an arrangement such as shown in FIG. 5(a) or 5(b) for the ultraviolet laser pulse measurement, in which a cell 6 filled with a gas is inserted into the measurement system in place of the nonlinear crystal.

In the arrangement shown in FIG. 5(a), the measurement is conducted by detecting a signal of ions generated in the gas cell 6 by the absorption of multiple ultraviolet laser photons. For this purposes, a pair of electrodes 7 are disposed in the gas cell 6 for collecting the ions and the relative number of ions produced is counted.

In the arrangement shown in FIG. 5(b), the measurement is conducted by detecting a signal of fluorescent light reemitted from the gas after absorption of the multiple ultraviolet photons. Specifically, the fluorescent light passing out of the gas cell 6 is collected by a lens 9, passed through a filter 8 and detected by a light detector 5.

The ion signal or the fluorescent light signal is observed as a function of the position of either the reflecting mirror M2 or the reflecting mirror M3 of the autocorrelator 1, whereby the duration, the width or the like of the laser pulse is measured.

While the measurement method shown in FIG. 4 using the nonlinear crystal 3 is simple and enables precise measurement, it has a drawback related to the fact that the wavelength dependence of refraction index (dispersion) of a nonlinear crystal is generally large. In the measurement related to ultrashort laser pulses, therefore, the measurement gives a pulse-width value larger than the actual value if the crystal thickness is beyond an appropriate range.

While this means that, for improving the measurement precision, the thickness of crystal used has to be reduced as the laser pulse width to be measured becomes shorter, as a practical matter it is very difficult to make thin crystals having a good surface parallelism and an extremely small surface roughness. Moreover, a thin crystal weakens the second harmonic signal and is often unable to produce a detectable signal of adequate magnitude.

In the measurement of ultraviolet ultrashort laser pulses by detecting the ion signal in the manner shown in FIG. 5(a), the measurement precision is liable to be seriously degraded by dielectric breakdown of the cell gas, recombination of electrons and ions and the like. The method thus has the disadvantage of requiring various complex procedures in selecting the gas and the gas pressure, optimizing the intensity of the laser beam to be measured, optimizing the voltage applied on the electrodes for ion collection and otherwise determining the best measurement conditions.

The ultraviolet ultrashort laser pulse measurement by observing fluorescent light in the manner shown in FIG. 5(b) has problems in that, depending on the incident laser wavelength, the sample gas has to be selected for ensuring that the multiple photons are resonantly absorbed by the gas and the reemission of light from the gas is easy to be detected. For these reasons, the method cannot be applied to the measurement of ultraviolet ultrashort laser pulses of arbitrary wavelength.

In addition, the cell gas pressure gas has to be optimized for preventing loss of the absorbed light energy by collisions between the gas atoms or molecules, and the incident laser intensity has to be optimized for preventing secondary excitation or deexcitation.

FIG. 6 shows an example of the results obtained by the method of FIG. 5(b), where ultrashort KrF excimer laser (wavelength: 248 nm) pulses were directed into molecular xenon ($Xe_2$) gas sealed in a cell and the fluorescent light emitted was detected with a light detector. Since either of the two beams into which the laser beam is split produces a fluorescent signal by itself, it is impossible to avoid a background signal C from overlapping the signal B to be detected and a resulting decrease in the signal to noise ratio of the autocorrelation signal for the pulse measurement.

An object of this invention is to overcome the aforesaid shortcomings of the prior art methods by providing a method for measuring ultrashort laser pulses which enables simple, high-precision measurement of ultrashort laser pulses without using a nonlinear crystal or a cell filled with a gas.

Another object of the invention is to provide an apparatus for carrying out the method.

SUMMARY OF THE INVENTION

For achieving the first object, the invention provides a method for measuring ultrashort laser pulses which comprises the steps of disposing a nozzle in vacuum, continuously or intermittently producing an atomic or molecular gas beam from the nozzle into the vacuum, directing ultrashort laser pulses into the beam to produce harmonic radiation of the laser light or produce ions by absorption of multiple laser photons, and detecting a signal related to the harmonic or the ions.

For achieving the second object, the invention provides an apparatus for measuring ultrashort laser pulses comprising means for producing an atomic or molecular gas beam into an evacuated vessel, means for directing ultrashort laser pulses for measurement into the gas beam and means for detecting a signal related to harmonic radiation of the laser light produced by the pulse or a signal related to ions produced by absorption of multiple laser photons.

The ultrashort laser pulse to be measured is split into two laser pulses by an autocorrelator of the type described earlier, the two pulses from the autocorrelator are recombined, and the recombined pulses are directed into the atomic or molecular gas beam. When the propagation path lengths of the two laser pulses are the same, third harmonic ($\lambda/3$) radiation and/or an enhanced number of ions are produced in the gas beam. When the laser pulse is intense enough, higher-order harmonics such as fifth- and seventh-order harmonics will be generated, and these high-order harmonic signals can also be used for the ultrashort pulse measurements.

When the difference between the propagation path lengths of the two laser pulses is larger than that corresponding to the laser pulse duration, neither a harmonic signal nor an enhanced ion signal is produced. Therefore, by adjusting the pulse propagation path lengths in the autocorrelator, it is possible to measure the duration and pulse width of ultrashort laser pulses.

Since the present method does not use a nonlinear crystal or a gas-filled cell, the defects arising from the use of these devices are totally eliminated, making it possible to measure the duration and pulse width of ultrashort laser pulses, including ultrashort pulses of ultraviolet light, simply and with high precision.

These and other objects and features of the invention will be better understood from the following description made with respect to the drawings.

BRIEF DESCRIPTION OF THE DRAWINGS

FIG. 3(a) is a graph showing the relationship between the detected third-harmonic signal and the optical time delay when an ultrashort laser pulse is measured by the apparatus of FIG. 2.

FIG. 3(b) is a graph showing the relationship between the fifth-harmonic signal, which was detected in the same manner as in FIG. 3(a), and the optical time delay.

FIG. 3(c) is a graph showing the relationship between the ion signal produced by the four-photon absorption and the optical time delay.

FIG. 6 is a graph showing the relationship between the fluorescent light intensity and an optical time delay when an ultrashort laser pulse is measured by the apparatus of FIG. 5(b).

DESCRIPTION OF THE PREFERRED EMBODIMENT

Figure 1:
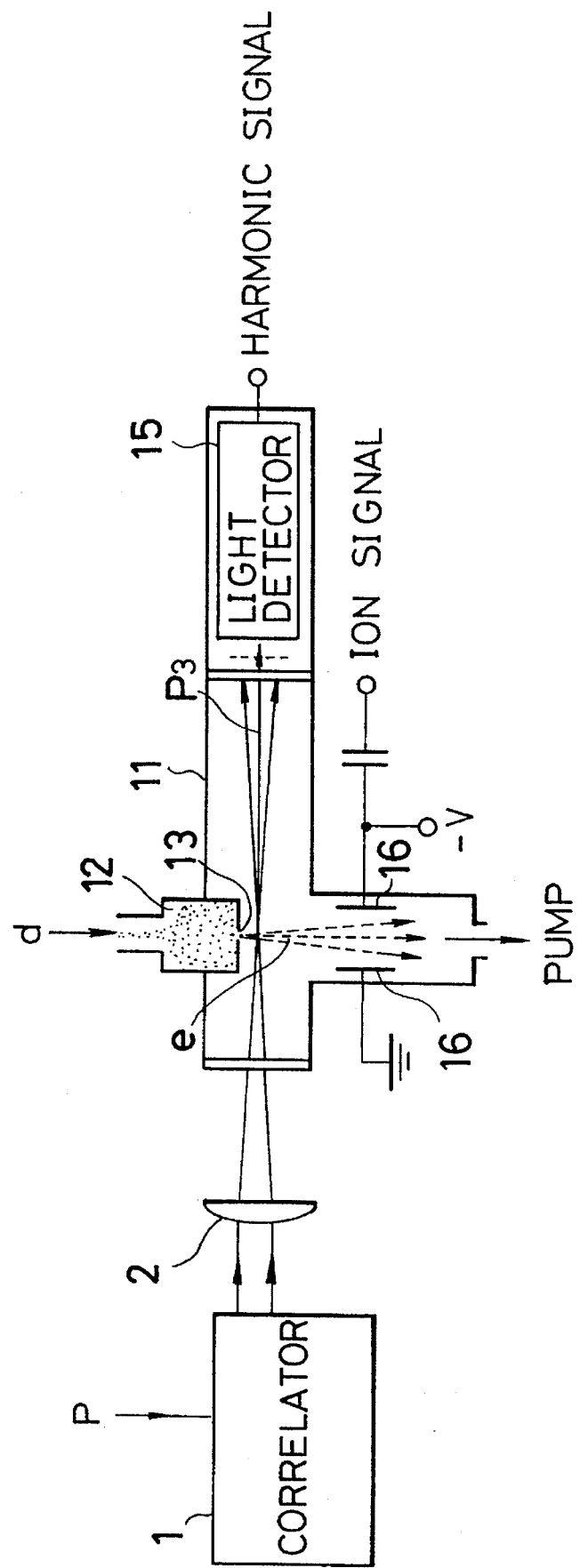
FIG. 1 is a schematic view of the basic configuration of an apparatus for measuring ultrashort laser pulses in accordance with the invention.

FIG. 1 shows the basic configuration of the ultrashort laser pulse measurement apparatus according to the invention. The apparatus consists of a vacuum vessel 11 and a beam generator 12 having a nozzle 13 located inside the vacuum vessel 11. An atomic or molecular gas d supplied to the beam generator 12 is jetted from the nozzle 13 of which outlet is located inside the vacuum vessel 11.

While the atomic or molecular gas jetted from the beam generator 12 can be of any type, it is simplest to use one that is in gas phase at room temperature. Specific examples are argon gas, krypton gas, xenon gas and nitrogen gas. The atomic or molecular gas is jetted into the vacuum as a supersonic beam e. Therefore, in contrast to the prior art methods, there is no requirement for a vessel to confine a gas or for optical elements for the purpose of the gas seal, and accordingly, the restrictions concerning light and ion detection that result from the use of a vessel or optical elements are completely absent. The gas beam can be jetted either continuously or intermittently (in a pulsed mode).

After the gas beam e starts to be jetted from the beam generator 12 in the foregoing manner, ultrashort laser pulses whose properties are to be measured are introduced into the gas beam from the direction perpendicular to the jetting gas. The interaction of the laser pulse with the atomic or molecular gas generates harmonic radiation in the gas beam e. At the same time, ions can be produced in the gas beam as a result of absorption of multiple laser photons.

The harmonic radiation generated is detected by a light detector 15. More specifically, when the harmonic wavelength is longer than about 200 nm, the harmonic is easily detected by a photomultiplier or other such light detector located outside the vacuum vessel 11. When the harmonic wavelength is less than about 200 nm, the harmonic is either detected by a light detector located inside the vacuum vessel 11 or a scintillator is provided inside the vacuum vessel 11 and the light emitted from the scintillator exposed to the harmonic is detected by a light detector located in the air. When the wavelength of a laser pulse to be measured is in the ultraviolet region of less than 315 nm, even though the wavelength of the harmonic produced becomes shorter than 105 nm, it can nevertheless be readily detected by a light detector provided inside the vacuum vessel or by a combination of a scintillator and a light detector.

When the ions produced in the gas beam e are to be detected, an arrangement similar to that shown in FIG. 1 is used. Specifically, a pair of electrodes 16 is disposed in a downstream portion of the gas beam, the ions produced are collected by applying a constant voltage across the electrodes, and an ion signal is produced on the basis of the collected ions.

Figure 4:
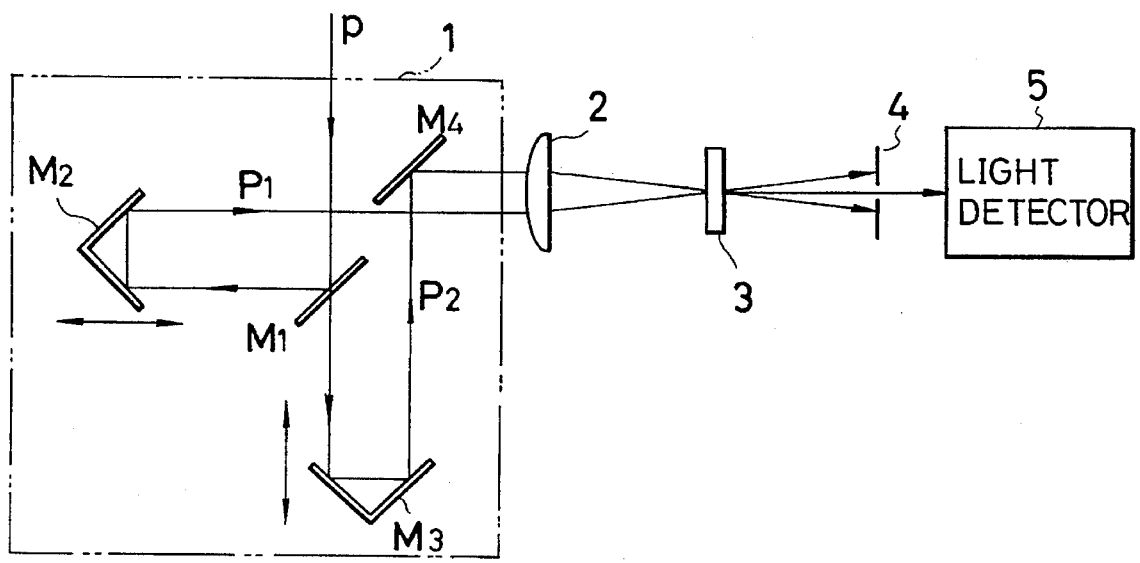
FIG. 4 is a schematic view illustrating a prior art method of measuring ultrashort laser pulses using a nonlinear crystal.

Also similarly to what was described earlier, a laser pulse p to be measured is split into two laser pulses $p_1$ and $p_2$, the two pulses are recombined into parallel beams, and the recombined beams are focused into the gas beam e in the vacuum vessel 11 by a lens 2. If the propagation path lengths of the two pulses are equal, the third harmonic ($\lambda/3$) radiation is produced as the strongest harmonic and travels along the optic axis $p_3$ approximately bisecting the angle of intersection between the two pulses. When the laser pulse intensity is high, the fifth harmonic ($\lambda/5$), the seventh harmonic ($\lambda/7$) and the other higher-order harmonics are also produced in approximately the same direction. Thus the gas beam e operates as a nonlinear medium equivalent to the nonlinear crystal shown in FIG. 4. Differently from the nonlinear crystal, however, it does not require machining the nonlinear medium and is not subject to any limitation on the wavelength of the ultrashort laser pulses to be measured.

An embodiment of the apparatus capable of easily and accurately measuring ultraviolet ultrashort laser pulses will now be explained with reference to FIG. 2. The basic configuration of the apparatus is the same as that shown in FIG. 1.

The apparatus was operated to measure ultraviolet XeCl excimer laser pulses (wavelength: 308 nm) having a pulse width of subpicosecond order. The XeCl laser pulses were generated at a repetition rate of 10 Hz and sent to the autocorrelator 1. A pulsed gas beam e was jetted into the vacuum vessel 11 through the nozzle 13 synchronously with the laser pulses at a repetition rate of 10 Hz.

Each laser pulse p entering the autocorrelator 1 was split into two pulses $p_1$, $p_2$ by the half-mirror M1, and then the pulse $p_1$ was reflected by the reflecting mirror M2 and the pulse $p_2$ by the reflecting mirrors M3 and M4 so as to cause both pulses to travel from the autocorrelator 1 in parallel with each other and pass through the lens 2 to be focused at a single point in the gas beam e jetted into the vacuum vessel 11. The beam e was formed by jetting argon gas through a 1-mm diameter nozzle synchronously with the laser pulse at a repetition rate of 10 Hz.

The third and fifth harmonics were produced in the direction approximately bisecting the angle of the two laser pulses $p_1$, $p_2$ incident on the gas beam. For separating the harmonic radiation to be measured from the incident laser light and from the other harmonics, a vacuum ultraviolet spectrometer 17 having a focal length of 20 cm was disposed between the vacuum vessel 11 and the light detector 15. An electron multiplier was used as the light detector for the harmonics. The harmonic signal from the electron multiplier was processed by a boxcar averager and recorded by a recorder (neither shown).

In addition to the generation of harmonics as explained above, the XeCl laser light incident on the argon gas beam also causes four-photon ionization of argon atoms. For measuring the relative number of argon ions produced as a result, the apparatus shown in FIG. 2 is provided with a cylindrically shaped electrode 16 at a downstream portion of the gas beam, as placed apart from the focusing point of the laser pulses. A constant voltage of −9 V was applied to the electrode 16 and the ion signal obtained therefrom was processed by the boxcar averager and then recorded by the recorder.

The graph of FIG. 3(a) shows the intensity variation of the third harmonic (wavelength: 102.6 nm) observed as a function of the optical time delay between pulses $p_1$ and $p_2$. Here, the optical time day was produced by translating the reflecting mirror M2 of the autocorrelator in FIG. 2, and an electron multiplier was used as the light detector in the apparatus of FIG. 2.

The graph of FIG. 3(b) shows the intensity variation of the fifth harmonic (wavelength: 61.6 nm) observed as a function of the optical time delay between the two pulses $p_1$, $p_2$ under the same conditions as in FIG. 3(a).

It will be noted that neither of the graphs shown in FIGS. 3(a) and 3(b) includes a background signal and that the detected harmonic signals increase with the decrease in the optical time delay (the difference in the propagation distances) between the two pulses. Therefore, it was possible to determine accurately the ultrashort laser pulse width from one of these graphs. For example, from the harmonic signal variation shown in FIG. 3(a), the full width at half maximum (FWHM) of the signal shape is estimated to be 460 fsec. Since the ultrashort laser pulse shape is given by a function of $sech^2$, this FWHM on the graph gives a laser pulse width of 360 fsec, which is derived by multiplying by a well-known factor of 0.775 (460 fsec×0.775=360 fsec) for $sech^2$ pulse. Similarly, from the fifth harmonic signal shown in FIG. 3(b), the laser pulse width is estimated to be 360 fsec. The results shown in FIGS. 3(a) and 3(b) both gave the same value, ensuring the reliability and accuracy of the measurements.

Figure 2:
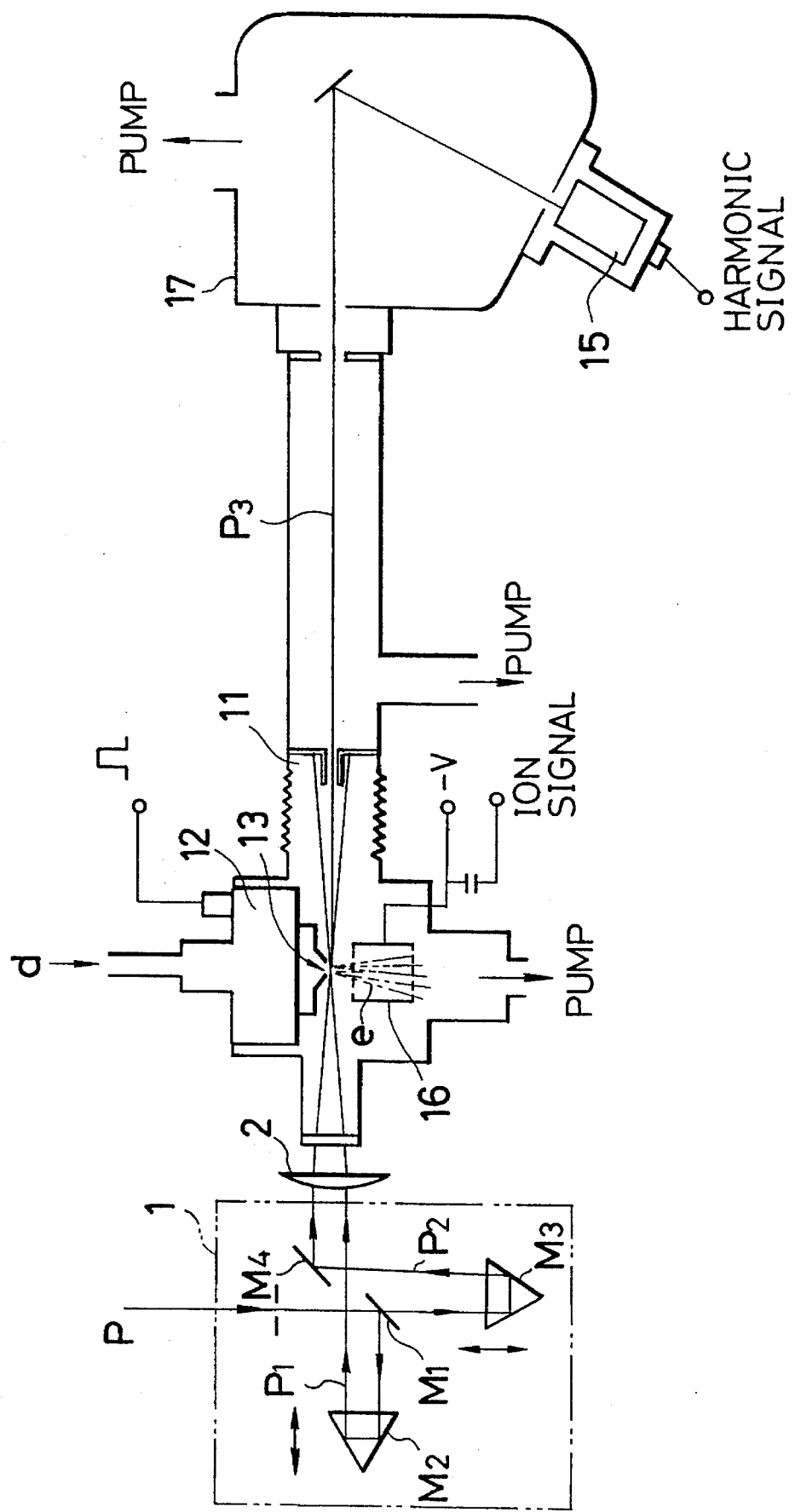
FIG. 2 is a schematic view of an embodiment of the apparatus for measuring ultrashort laser pulses according to the invention.

The graph of FIG. 3(c) shows the ion-signal variation measured by the ion collector as a function of the optical time delay produced between the pulse $p_1$ and pulse $p_2$ in the apparatus of FIG. 2. It is noted that, as in the case of the harmonic signal, the ion signal also increases with the decrease in the optical time delay between the two pulses. It is also possible to determine the laser pulse width from this graph, as in the case of harmonic data. Although the ion signal includes a background signal, unavoidably in view of the principle involved, it can be reduced to a negligible level by adjusting the ion detection sensitivity, as shown in FIG. 3(c). However, reducing the sensitivity introduces a measurement error, which in the case at hand resulted in a measured laser pulse width of 340 fsec, slightly smaller than that obtained from the graphs of FIGS. 3(a) and 3(b).

As explained in the foregoing, this invention uses a gas beam as a nonlinear medium. Compared with a nonlinear crystal or other such solid-state nonlinear medium, the atomic and molecular gas beams exhibit markedly smaller dispersion. Thus, while the large dispersion of a nonlinear crystal requires it to be adjusted in size (thickness), the gas beam never requires any particular adjustment in this regard. In the embodiment just described, for example, the beam of about 1 mm in diameter had no effect on the measurement precision and did not give any measurement error arising from the nonlinear medium size.

Moreover, in the invention, because use is made of a gas beam jetted into vacuum as the nonlinear medium, in the detection of harmonics for the purpose of laser pulse measurements, there is no specific limitation concerning the wavelength of the laser pulse to be measured and the type of gas jetted into vacuum. Thus, this invention provides a simple, versatile and reliable method for accurate measurement of ultrashort laser pulses.

Furthermore, the number density of the jetted gas beam need only be adjusted to a level enabling detection, by controlling the backing pressure in the beam generator. Thus, there is no specific requirement for setting various measurement conditions as is required when the conventional methods based on fluorescence and ionization signals are used for measuring the properties of ultraviolet laser pulses.

In addition, since the invention is able to use harmonic detection even for the measurement of ultraviolet laser pulses, the signal obtained by the detection does not include a background signal. Thus, the measurement can be conducted with higher precision than has been possible with the prior art ultraviolet, ultrashort laser pulse measurement methods, which inherently involve a background signal.

Figure 5A:
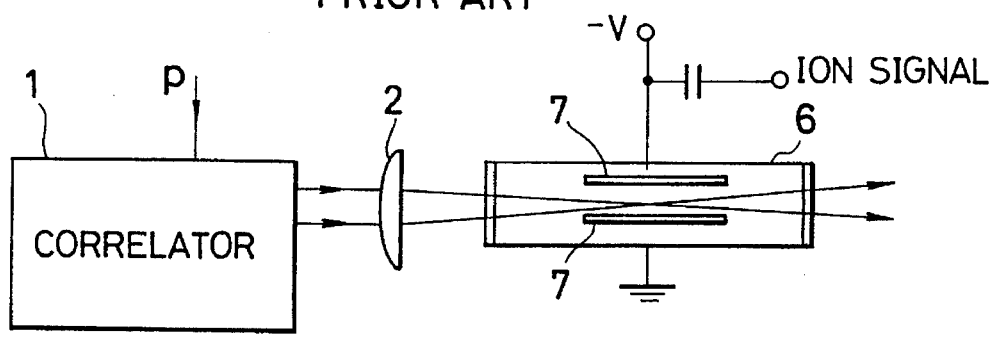
FIG. 5(a) is a schematic view illustrating a prior art method of measuring ultraviolet ultrashort laser pulses using detection of an ion signal produced in a cell filled with a gas.
Figure 5B:
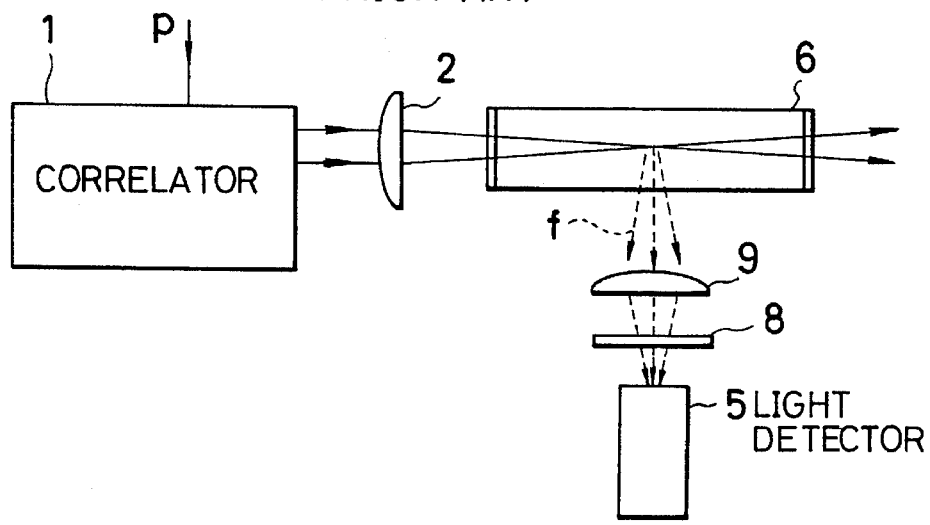
FIG. 5(b) is a schematic view illustrating another prior art method of measuring ultraviolet ultrashort laser pulses using detection of fluorescent light emitted from a gas contained in a cell.

When the invention carries out the pulse measurement through the detection of an ion signal, it operates on the same principle as that illustrated in FIG. 5(a), and accordingly the detection signal unavoidably includes a background signal. However, since the invention uses a medium that is jetted as a supersonic beam, the effect of collisions among the medium particles (atoms or molecules) on the measurement is so small as to be negligible. Compared with the method of FIG. 5(a) involving the use of a gas statically sealed in a cell, therefore, the optimization of measurement conditions and the procedures for determining the conditions are greatly simplified.

What is claimed is:

1. A method for measuring ultrashort laser pulses, comprising the steps of:
   dividing each ultrashort laser pulse to be measured into two pulses;
   causing the two divided pulses to travel along two different propagation paths, then recombining the two divided pulses;
   directing the recombined pulses into an atomic or molecular gas beam jetted into a vacuum atmosphere;
   varying a length of one of the two propagation paths to coincide with a length of the other of the two propagation paths for the purpose of producing harmonic radiation; and
   detecting the produced harmonic radiation with a light detector as a function of the length of one of the two propagation paths to thereby measure said ultrashort laser pulses which have wavelengths less than 400 nm.

2. A method according to claim 1, wherein the gas beam is jetted from the nozzle continuously.

3. A method according to claim 1, wherein the gas beam is jetted from the nozzle intermittently.

4. A method according to claim 1, wherein the gas beam is selected from the group consisting of an argon gas beam, a krypton gas beam, a xenon gas beam and a nitrogen gas beam.

5. A method of measuring ultrashort laser pulses, comprising the steps of:
   dividing each ultrashort laser pulse to be measured into two pulses;
   causing the two divided pulses to travel along two different propagation paths, then recombining the two divided pulses;
   directing the recombined pulses into an atomic or molecular gas beam jetted into a vacuum atmosphere;
   varying a length of one of the two propagation paths to coincide with a length of the other of the two propagation paths for the purpose of producing ions in the gas beam;
   collecting the produced ions with an electrode to which an electric voltage is applied; and
   counting the number of the collected ions as a function of the length of one of the two propagation paths to thereby measure said ultrashort laser pulses which have wavelengths less than 400 nm.

6. A method according to claim 5, wherein the gas beam is jetted from the nozzle continuously.

7. A method according to claim 5, wherein the gas beam is jetted from the nozzle intermittently.

8. A method according to claim 5, wherein the gas beam is selected from the group consisting of an argon gas beam, a krypton gas beam, a xenon gas beam and a nitrogen gas beam.

9. An apparatus for measuring ultrashort laser pulses comprising:
   means for dividing each ultrashort laser pulse to be measured into two pulses;
   means for causing the two divided pulses to travel along two different propagation paths;
   means for recombining the two pulses having travelled along the two different propagation paths;
   means for directing the recombined pulses into an atomic or molecular gas beam jetted into a vacuum atmosphere;
   means for varying a length of one of the two propagation paths to coincide with a length of the other of the two propagation paths for the purpose of producing harmonic radiation in the gas beam; and
   light detecting means for detecting the harmonic radiation produced in the gas beam as a function of the length of one of the two propagation paths to thereby measure said ultrashort laser pulses which have wavelengths less than 400 nm.

10. An apparatus according to claim 9, wherein said light detecting means is an optical detector located outside said vacuum atmosphere for detecting the harmonic radiation when the harmonic wavelength is not less than about 200 nm.

11. An apparatus according to claim 9, wherein said light detecting means is an optical detector located inside said vacuum atmosphere for detecting the harmonic radiation when the harmonic wavelength is less than about 200 nm.

12. An apparatus according to claim 9, wherein said light detecting means is a combination scintillator located inside said vacuum atmosphere and light detector located outside said vacuum atmosphere for detecting the harmonic radiation when the harmonic wavelength is less than about 200 nm.

13. An apparatus for measuring ultrashort laser pulses, comprising:
   means for dividing each ultrashort laser pulse to be measured into two pulses;

means for causing the two divided pulses to travel along two different propagation paths;

means for directing the recombined pulses into an atomic or molecular gas beam jetted into a vacuum atmosphere;

means for varying a length of one of the two propagation paths to coincide with a length of the other of the two propagation paths for the purpose of producing ions through absorption of multiple laser photons;

electrode means located in a downstream portion of the jetted gas beam to collect produced ions; and means for counting the number of the collected ions as a function of the length of one of two propagation paths to thereby measure said ultrashort laser pulses which have wavelengths less than 400 nm.

14. An apparatus according to claim 13, wherein the electrode means is a cylindrical electrode to which a prescribed negative voltage is applied.

* * * * *